(12) United States Patent
Sohn

(10) Patent No.: US 9,065,153 B2
(45) Date of Patent: Jun. 23, 2015

(54) ELECTRODE PLATE, ELECTRODE ASSEMBLY AND MANUFACTURING METHOD OF ELECTRODE PLATE

(75) Inventor: Youngbae Sohn, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 356 days.

(21) Appl. No.: 12/861,684

(22) Filed: Aug. 23, 2010

(65) Prior Publication Data

US 2011/0052972 A1 Mar. 3, 2011

(30) Foreign Application Priority Data

Sep. 2, 2009 (KR) ........................ 10-2009-0082374

(51) Int. Cl.
| | | |
|---|---|---|
| H01M 2/16 | (2006.01) | |
| H01M 2/18 | (2006.01) | |
| H01M 2/26 | (2006.01) | |
| H01M 4/04 | (2006.01) | |
| H01M 4/64 | (2006.01) | |
| H01M 10/42 | (2006.01) | |
| H01M 4/36 | (2006.01) | |

(52) U.S. Cl.
CPC ...... *H01M 10/4235* (2013.01); *Y10T 29/49115* (2015.01); *H01M 2/26* (2013.01); *H01M 4/64* (2013.01); *H01M 2/1646* (2013.01); *H01M 2/18* (2013.01); *H01M 4/0404* (2013.01); *H01M 4/366* (2013.01)

(58) Field of Classification Search
USPC ........... 429/461, 144, 431, 152, 94, 247, 126, 429/233; 29/623.3
See application file for complete search history.

(56) References Cited

U.S. PATENT DOCUMENTS

| | | | | |
|---|---|---|---|---|
| 5,439,760 | A * | 8/1995 | Howard et al. ................ 429/94 |
| 6,162,264 | A * | 12/2000 | Miyazaki et al. ............ 29/623.5 |
| 6,287,720 | B1 * | 9/2001 | Yamashita et al. ............ 429/131 |
| 6,569,558 | B1 * | 5/2003 | Takeuchi et al. ................ 429/94 |
| 6,740,446 | B2 * | 5/2004 | Corrigan et al. .............. 429/152 |
| 2001/0001053 | A1 * | 5/2001 | Hanson et al. ................ 429/233 |
| 2008/0299450 | A1 * | 12/2008 | Lim ............................. 429/129 |
| 2009/0208838 | A1 | 8/2009 | Kim |

FOREIGN PATENT DOCUMENTS

| | | |
|---|---|---|
| JP | 07-220759 A | 8/1995 |
| JP | 2008-159333 A | 7/2008 |

(Continued)

OTHER PUBLICATIONS

Notice of Allowance dated Nov. 29, 2011 of corresponding Korean Patent Application No. 10-2009-0082374—5 pages.

(Continued)

*Primary Examiner* — Jonathan Crepeau
(74) *Attorney, Agent, or Firm* — Knobbe, Martens, Olson & Bear LLP

(57) ABSTRACT

An electrode plate, an electrode assembly and a manufacturing method of the electrode plate to prevent an internal electrical short occurring between electrode plates by forming a ceramic layer wrapping a current collector plate and an active material layer. The electrode plate includes a current collector plate having a first face and a second face opposite to the first face, an active material layer formed on at least one of the first face and the second face of the current collector plate, and a ceramic layer wrapping the current collector plate and the active material layer.

13 Claims, 8 Drawing Sheets

(56) References Cited

FOREIGN PATENT DOCUMENTS

| | | |
|---|---|---|
| KR | 10-2001-0104539 A | 11/2001 |
| KR | 10-2007-0105725 A | 10/2007 |
| KR | 10-2008-0066234 A | 7/2008 |
| KR | 10-2009-0089581 A | 8/2009 |

OTHER PUBLICATIONS

Korean Office Action dated Jun. 30, 2011 of corresponding Korean Patent Application No. 10-2009-0082374—4 pages.

* cited by examiner

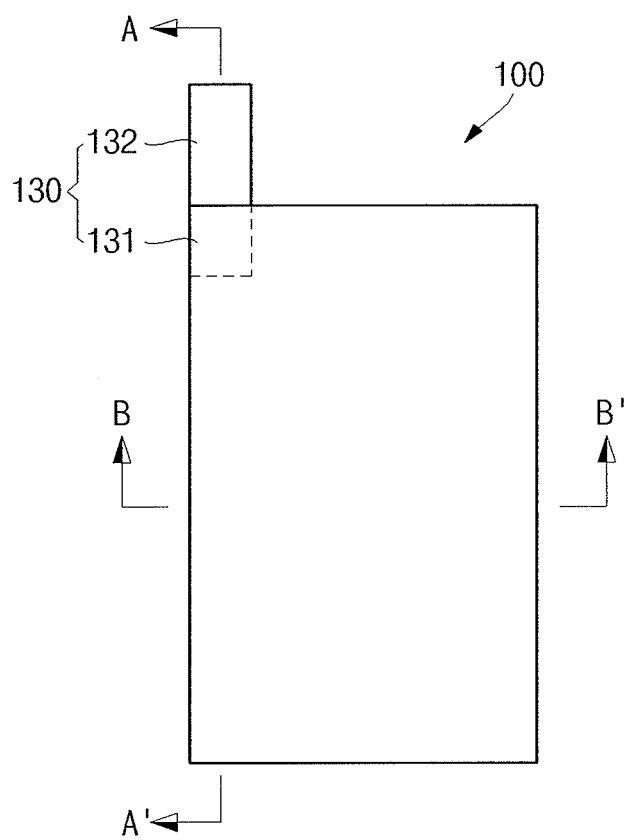

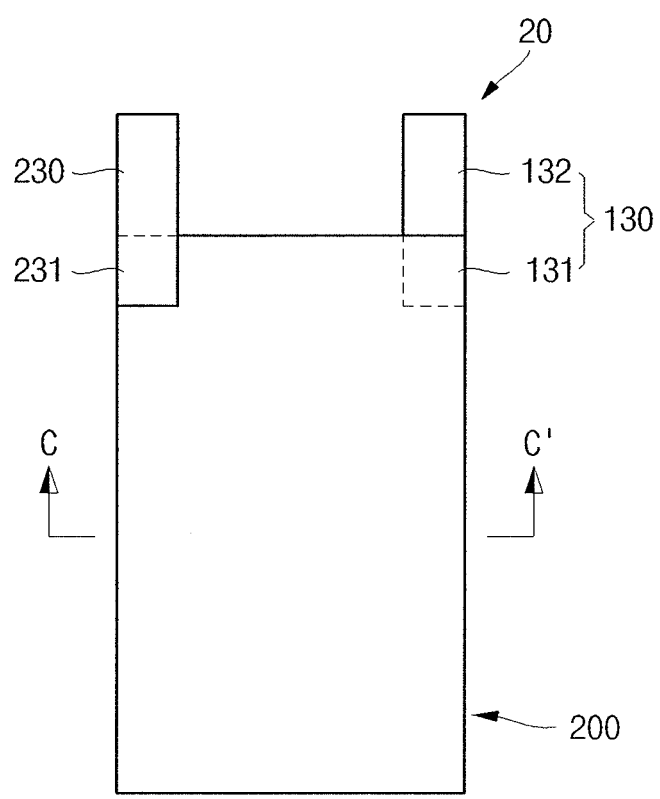

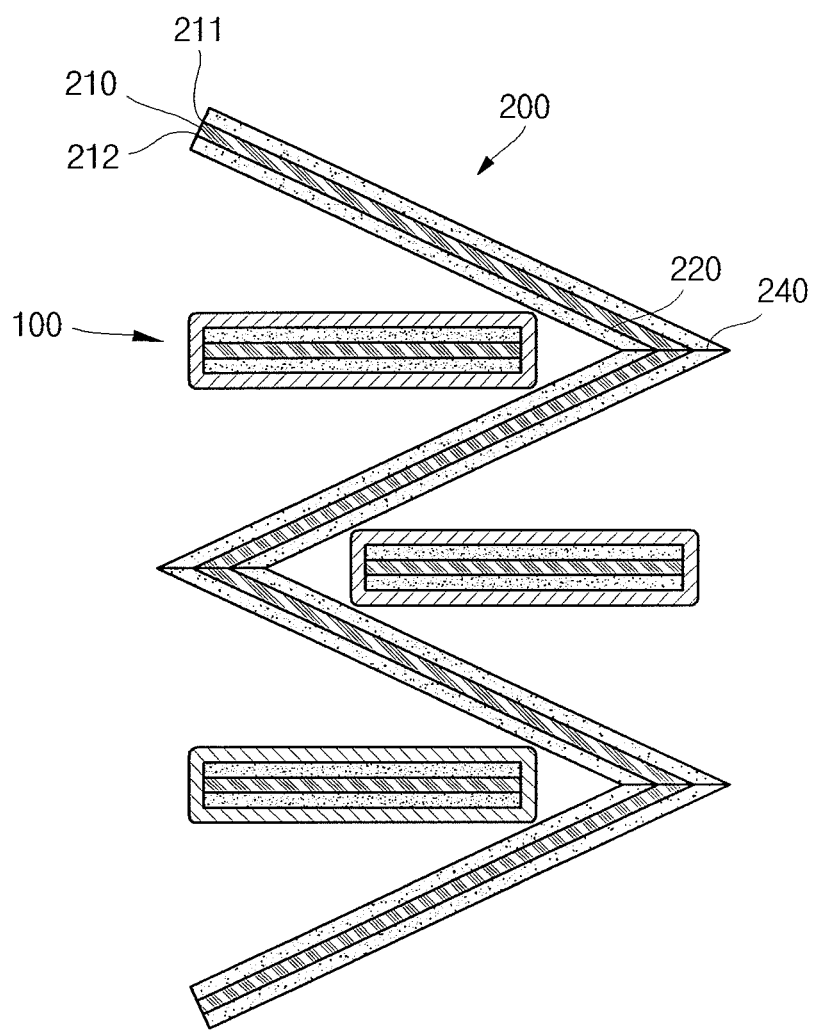

ELECTRODE PLATE, ELECTRODE ASSEMBLY AND MANUFACTURING METHOD OF ELECTRODE PLATE

CROSS-REFERENCE TO RELATED APPLICATION

This application claims the benefit of Korean Patent Application No. 10-2009-0082374, filed Sep. 2, 2009, in the Korean Intellectual Property Office, the disclosure of which is incorporated herein by reference.

BACKGROUND

1. Field

Aspects of the present invention relate an electrode plate, an electrode assembly and a manufacturing method of the electrode plate.

2. Description of the Related Art

Secondary batteries are manufactured in various types of configuration and can typically be divided into a cylinder type, a prismatic type, or the like. The secondary battery may include an electrode assembly having a positive electrode plate, a negative electrode plate and a separator, and a casing accommodating the electrode assembly. Generally, positive and negative electrode plates are formed by coating electrode active materials having positive and negative polarities, respectively, and disposing a separator between the positive and negative electrode plates to then be wound in a jelly roll configuration. Alternatively, an electrode group is formed by stacking multiple units of a positive electrode, a separator and a negative electrode, the electrode group is housed in a case, and a cap assembly having an external terminal connected thereto is installed in the case, thereby completing the battery.

Here, each of the positive and negative electrode plates includes a current collector plate and an active material collected on the current collector plate, and allows current flow between the positive and negative electrode plates.

SUMMARY

Aspects of the present invention provide an electrode plate, which can prevent an internal electrical short occurring between plates by forming a ceramic layer wrapping a collector and each of an active material layer, and can increase the volume capacity density in unit volume, an electrode assembly and a manufacturing method of the electrode plate.

According to an aspect of the present invention, there is provided an electrode plate including a current collector plate having a first face and a second face opposite to the first face, an active material layer formed on at least one of the first face and the second face of the current collector plate, and a ceramic layer wrapping the current collector plate and the active material layer.

According to an aspect of the present invention, the ceramic layer may include a first ceramic layer flatly coated on an outer surface of the first face of the current collector plate at a substantially uniform thickness, a second ceramic layer flatly coated on an outer surface of the second face, and a third ceramic layer coated on lateral surfaces of the current collector plate.

According to an aspect of the present invention, the third ceramic layer may be formed on the lateral surfaces of the current collector plate and the active material layer, and may include at least one material selected from the group consisting of silica ($SiO_2$), alumina ($Al_2O_3$), zirconium oxide ($ZrO_2$), and titanium oxide ($TiO_2$).

According to an aspect of the present invention, the ceramic layer may include at least one material selected from the group consisting of nitrides, hydroxides, alkoxides and ketone compounds of silicon (Si), aluminum (Al), zirconium (Zr), and titanium (Ti), which have an insulating property.

According to an aspect of the present invention, current collector plate may include an electrode tab provided at one side of the current collector plate, and the electrode tab has a portion coated with a ceramic material.

According to another aspect of the present invention, there is provided an electrode assembly including a plurality of first electrode plates each including a current collector plate having a first face and a second face opposite to the first face, an active material layer formed on at least one of the first face and the second face of the current collector plate, and a ceramic layer wrapping the current collector plate and the active material layer, and a plurality of second electrode plates each including a current collector plate and an active material layer, wherein the plurality of first electrode plates and the plurality of second electrode plates are alternately stacked.

According to an aspect of the present invention, each of the plurality of first electrode plates may include a ceramic layer coming into contact with the active material of each of the plurality of second electrode plates and the plurality of second electrode plates may be connected with each other.

According to yet another aspect of the present invention, there is provided a manufacturing method of an electrode plate, the method including forming an active material layer on at least one of a first face and a second face of a current collector plate, cutting the current collector plate, and coating the active material layer and the current collector plate to wrap the active material layer and the current collector plate.

According to another aspect of the present invention, the coating may include coating a ceramic material on the active material layer and the current collector plate and forming a ceramic layer.

According to an aspect of the present invention, the forming of the ceramic layer may include forming a first ceramic layer flatly coated on an outer surface of the first face of the current collector plate at a substantially uniform thickness, forming a second ceramic layer flatly coated on an outer surface of the second face, and forming a third ceramic layer coated on lateral surfaces of the current collector plate.

According to an aspect of the present invention, the coating of the third ceramic layer may include allowing the third ceramic layer to contact the lateral surfaces of the current collector plate and the active material layer, and may be performed using at least one material selected from the group consisting of silica ($SiO_2$), alumina ($Al_2O_3$), zirconium oxide ($ZrO_2$), and titanium oxide ($TiO_2$).

According to an aspect of the present invention, the coating of the ceramic layer may be performed using at least one material selected from the group consisting of nitrides, hydroxides, alkoxides and ketone compounds of silicon (Si), aluminum (Al), zirconium (Zr), and titanium (Ti).

According to an aspect of the present invention, the coating of the ceramic layer may be performed by dip coating or spray coating.

As described above, according to another aspect of the present invention, an internal electrical short occurring between electrode plates can be prevented by forming a ceramic layer wrapping a current collector plate and an active material layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A is a plan view of an electrode plate according to an embodiment of the present invention;

FIG. 2A is a plan view of an electrode assembly according to an embodiment of the present invention;

FIG. 2B is a cross-sectional view showing the line C-C' of FIG. 2A;

DETAILED DESCRIPTION

Figure 1B:
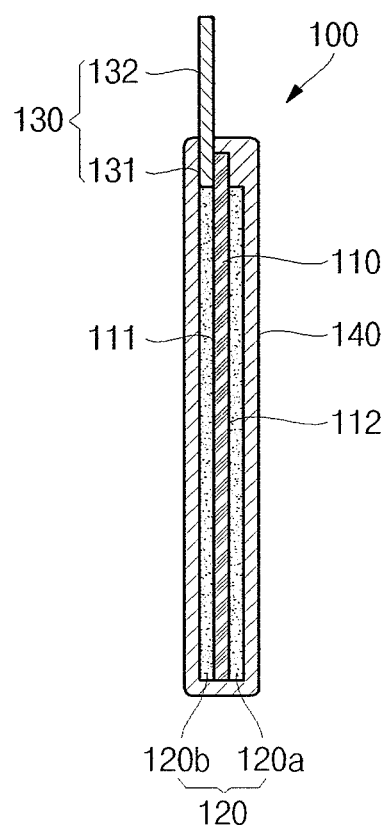
FIG. 1B is a cross-sectional view showing the line A-A' of FIG. 1A.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1C:
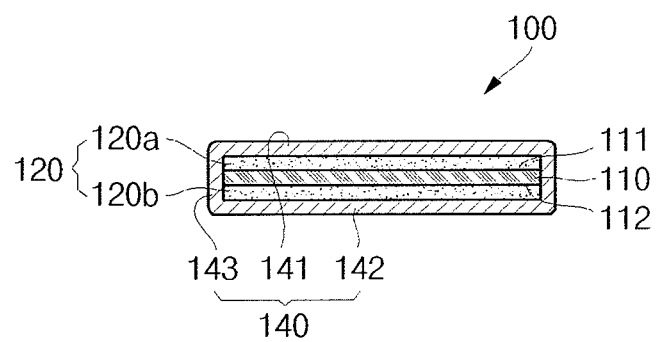
FIG. 1C is a cross-sectional view showing the line B-B' of FIG. 1A.

FIG. 1A is a plan view of an electrode plate according to an embodiment of the present invention, FIG. 1B is a cross-sectional view showing the line A-A' of FIG. 1A, and FIG. 1C is a cross-sectional view showing the line B-B' of FIG. 1A.

As shown in FIGS. 1A to 1C, the electrode plate 100, according to an embodiment of the present invention, includes a current collector plate 110, an active material layer 120 including a first active material layer 120a and a second active material layer 120b formed on respective faces of the current collector plate 110, an electrode tab 130 attached to the current collector plate 110, and a ceramic layer 140 coated on top and bottom surfaces of the active material layer 120 and on lateral surfaces of the current collector plate 110.

The current collector plate 110 includes a first face 111 and a second face 112 opposite to the first face 111, the first face 111 and the second face 112 both being substantially planar. The current collector plate 110 may be made of a metallic material. For example, when the current collector plate 110 is a positive current collector plate, it may be an aluminum (Al) foil or an Al mesh. When the current collector plate 110 is a negative current collector plate, it may be a copper (Cu) foil. However, aspects of the present invention are not limited to the listed examples and the current collector plate 110 may also be made of other conductive materials.

While the current collector plate 110 is substantially rectangular in the present embodiment, aspects of the present invention are not limited to the substantially rectangular shape of the current collector plate 110 and may vary in many ways.

The active material layer 120 is formed by coating an active material on at least one of the first face 111 and the second face 112 of the current collector plate 110 to form the first active material layer 120a and the second active material layer 120b on respective faces of the current collector plate 110. That is to say, the active material layer 120 is formed on the first face 111 of the current collector plate 110, excluding a region to which the electrode tab 130 is adhered. Accordingly, the active material layer 120 includes an uncoated portion that is not coated with the active material on the first face 111 of the current collector plate 110.

In addition, the active material layer 120 is formed by coating an active material at substantially the same thickness as the surface of the second face 112 of the current collector plate 110. When the current collector plate 110 is a positive current collector plate, the active material may be a metal oxide, such as $LiCoO_2$, $LiNiO_2$, or $LiMn_2O_4$. When the current collector plate 110 is for a negative current collector plate, the active material may be graphite. However, aspects of the present invention are not limited the materials given above and may be other active materials.

In addition, an electrode tab 130 is attached to one side of the current collector plate 110. The electrode tab 130 has an adhesion portion 131 and an extension portion 132. The adhesion portion 131 is directly adhered to the first face 111 of the current collector plate 110. The adhesion portion 131 may be adhered to the first face 111 by at least one welding method selected from ultrasonic welding, resistance welding and laser welding. However, aspects of the present invention are not limited thereto.

While the following description will be made with regard to a case in which the electrode tab 130 is adhered to the first face 111, however, aspects of the present invention are not limited thereto and the electrode tab 130 may also be adhered to the second face 112.

The extension portion 132 is formed such that it protrudes a predetermined length outward from the current collector plate 110. The ceramic layer 140 wraps top and bottom surfaces of the active material layer 120, or in other words, the first active material layer 120a and the second active material layer 120b of the active material layer 120, and lateral surfaces of the current collector plate 110.

That is to say, the ceramic layer 140 includes a first ceramic layer 141 flatly coated on an outer surface of the first face 111 of the current collector plate 110 at a substantially uniform thickness, a second ceramic layer 142 flatly coated on an outer surface of the second face 112, and a third ceramic layer 143 coated on lateral surfaces of the current collector plate 110. Specifically, the third ceramic layer 143 is formed on the lateral surfaces of the current collector plate 110, including a portion of the extension portion 132 of the electrode tab 130, and the active material layer 120.

In such a manner, the electrode plate 100 is wrapped by the ceramic layer 140, so as to not be exposed to the outside. Accordingly, since the ceramic layer 140 is formed to wrap the outer surfaces, that is, the top, bottom and lateral surfaces, of the electrode plate 100, the electrode plate 100 does not come into contact with an electrode plate having opposite polarity, thereby preventing an internal electrical short. In addition, formation of the ceramic layer 140 on surfaces of the electrode plate 100 eliminates a necessity of a separator to be disposed between two opposite electrode plates, thereby increasing a volume capacity density of a battery in a unit volume.

In order to improve stability and reliability of a battery, the ceramic layer 140 is preferably coated on the active material layer 120 at a substantially uniform thickness. In addition, the ceramic layer 140 should be substantially uniformly coated without defects. Here, defects include, for example, uncoated portions, streaks or cracks occurring to the ceramic layer 140, intermixing with foreign matter, and the like.

At least one material selected from silica ($SiO_2$), alumina ($Al_2O_3$), zirconium oxide ($ZrO_2$), and titanium oxide ($TiO_2$) may be used as the ceramic layer 140. Alternatively, at least one material selected from nitrides, hydroxides, alkoxides and ketone compounds of silicon (Si), aluminum (Al), zirconium (Zr), and titanium (Ti), which have an insulating property, may be used as the ceramic layer 140.

The listed materials are used in forming the ceramic layer 140 to form a porous layer using one of the materials. That is to say, the ceramic layer 140, wrapping the current collector plate 110 and the active material layer 120, is formed as a porous layer, thereby allowing movement of current between the electrode plate 100 and another electrode plate having a polarity opposite to that of the electrode plate 100.

Next, an electrode assembly employing the electrode plate 100, according to the previous embodiment, will be described. FIG. 2A is a plan view of an electrode assembly 20 according to an embodiment of the present invention, and FIG. 2B is a cross-sectional view showing the line C-C' of FIG. 2A.

Referring to FIGS. 2A and 2B, the electrode assembly 20 according to another embodiment of the present invention may include a plurality of first electrode plates 100 and a plurality of second electrode plates 200 each having different polarity from the plurality of first electrode plates 100. Here, each of the plurality of first electrode plates 100 is substantially the same as the electrode plate 100 of the previous embodiment. For the sake of convenience, in FIG. 2A, the first electrode plate 100 (see FIG. 1B) and the second electrode plate 200, which is illustrated as being disposed in front of the first electrode plate 100, will be defined as positive and negative electrode plates, respectively.

Here, a negative electrode tab 230 formed at each of the negative electrode plates 200 and a positive electrode tab 130 formed at each of the positive electrode plates 100 are spaced apart from each other substantially in parallel with each other.

In particular, as shown in FIG. 2B, the plurality of negative electrode plates 200 are connected with each other, and the positive electrode plates 100 are formed between each of the plurality of negative electrode plates 200.

Each of the plurality of negative electrode plates 200 includes a current collector plate 210 and an active material layer 220 formed on top and bottom surfaces of the current collector plate 210.

The current collector plate 210 includes a first face 211 and a second face 212 opposite to the first face 211, the first face 211 and the second face 212 both being substantially planar. The current collector plate 210 collects currents from the active material layer 220, and may be made of the same material as that of the electrode plate 100 shown in FIGS. 1B and 1C.

In addition, an electrode tab 230 is attached to one side of the current collector plate 210. The electrode tab 230 is formed such that it extends a predetermined length outward from the current collector plate 210. Alternatively, the electrode tab 230 may attached to, for example, a corner of one side of the current collector plate 210, however, aspects of the present invention are not limited thereto. The electrode tab 230 attached to the current collector plate 210 may be made of nickel. However, aspects of the present invention are not limited thereto, and other suitable materials may be used to form the electrode tab 230.

The active material layer 220 is formed on a first face 211 and a second face 212 of the current collector plate 210. The active material layer 220 is formed by coating an active material on at least one of the first face 211 and the second face 212 of the current collector plate 210.

The active material layer 220 is coated on the first face 211 and the second face 212, excluding an adhesion portion 231 of the electrode tab 230. That is to say, the active material layer 220 is coated on the first face 211 of the current collector plate 210 at a substantially uniform thickness. Here, an uncoated portion exists on the first face 211 of the current collector plate 210, excluding the electrode tab 230. Further, an active material may also be coated on the bottom surface of the second face 212 of the current collector plate 210 at a substantially uniform thickness. Since the current collector plate 210 has a positive polarity, the active material layer 220 may be formed of a metal oxide, such as $LiCoO_2$, $LiNiO_2$, or $LiMn_2O_4$. However, aspects of the present invention are not limited thereto and the active material layer 220 may be formed of other metal oxides or suitable materials.

A plurality of units of the aforementioned negative current collector plate 210 are stacked and then connected to each other using connection mechanism. Here, a contact surface 240 is produced at the negative electrode plate 200. That is, the contact surface 240 is produced to achieve a mechanical connection between each of the plurality of negative electrode plates 200. Each of the plurality of positive electrode plates 100 is disposed between each of the plurality of negative electrode plates 200. That is to say, the plurality of positive electrode plates 100 are disposed at a space for mechanically connecting the plurality of negative electrode plates 200 to each other. The configuration of the positive electrode plate 100 is substantially the same as that of electrode plate 100 shown in FIG. 1B, and a detailed explanation thereof will not be given.

Figure 3:
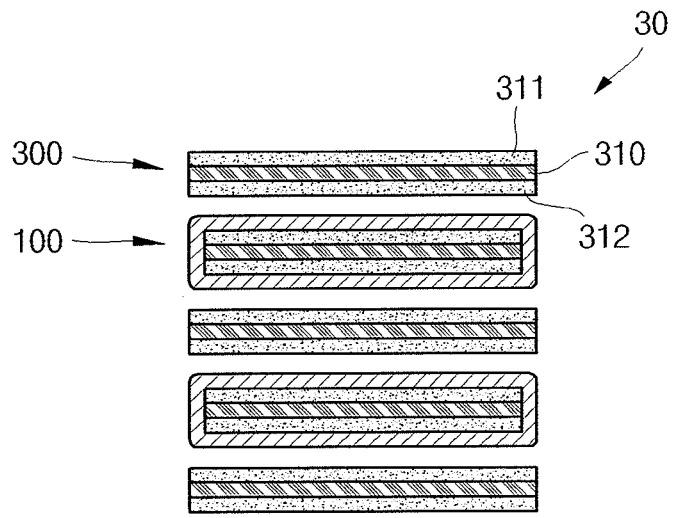
FIG. 3 is a cross-sectional view of an electrode assembly according to another embodiment of the present invention.

FIG. 3 is a cross-sectional view of an electrode assembly according to another embodiment of the present invention. As shown in FIG. 3, the electrode assembly 30 includes a plurality of first electrode plates 100 and a plurality of second electrode plates 300, each disposed alternately with each of the plurality of first electrode plates 100, and including a current collector plate 310 and active material layers 311 and 312.

The electrode assembly 30 shown in FIG. 3 is substantially the same as the electrode assembly 20 shown in FIG. 2, and the following explanation will be given with emphasis on differences therebetween.

Each of the second electrode plates 300 are constructed in a stack type in which both ends of the second electrode plate 300 are exposed to the outside, rather than an integration type. Accordingly, a second active material layer 312 of the second electrode plate 300 comes into contact with each of the first electrode plates 100.

Figure 4:
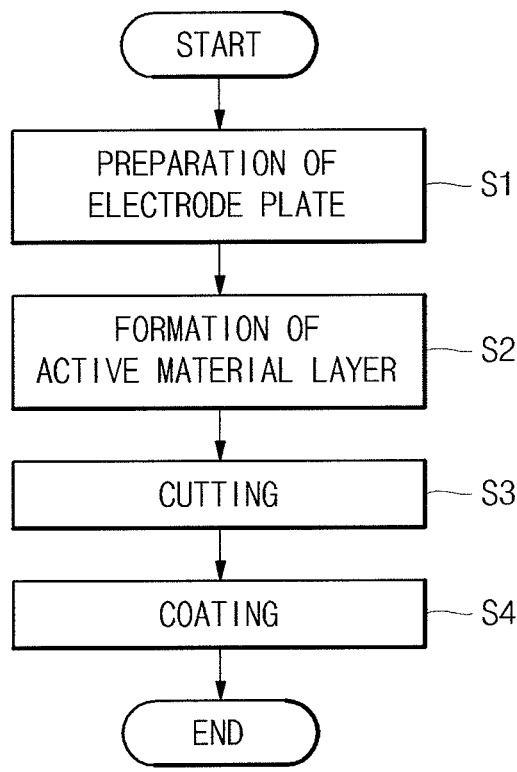
FIG. 4 is a flowchart illustrating a manufacturing method of an electrode plate according to an embodiment of the present invention.

Referring to FIG. 4, the manufacturing method of an electrode plate according to an embodiment of the present invention includes operations of preparation of an electrode plate (S1), formation of an active material layer (S2), cutting (S3) and coating (S4).

Figure 5A:
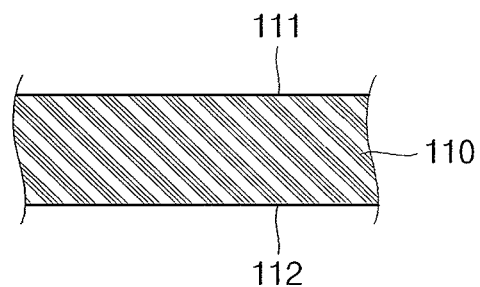
FIGS. 5A to 5F are sectional views illustrating a manufacturing method of an electrode plate according to another embodiment of the present invention.

FIGS. 5A to 5F are sectional views illustrating a manufacturing method of an electrode plate according to another embodiment of the present invention. Referring to FIG. 5A, an electrode plate is first prepared in operation S1.

In operation S1, a current collector plate 110, including a first face 111 and a second face 112 opposite to the first face 111, is prepared. That is to say, the current collector plate 110 includes the first face 111 and the second face 112 opposite to each other and both being substantially planar. The current collector plate 110 that serves to collect a current from the active material layer 120 may be made of a metallic material. For example, when the current collector plate 110 is a current collector for a positive current collector plate, it may be an aluminum (Al) foil or an Al mesh. When the current collector plate 110 is a negative current collector plate, it may be a copper (Cu) foil. However, aspects of the present invention are not limited to the listed example. In addition, while the current collector plate 110 is substantially rectangular in the illustrated embodiment, the shape of the current collector plate 110 is not limited thereto and may vary in many ways.

Figure 5B:
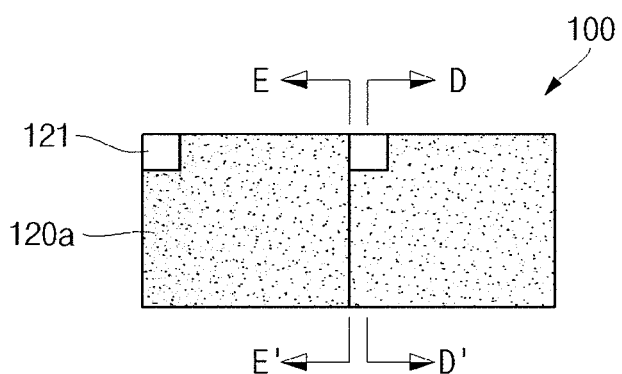
Figure 5C:
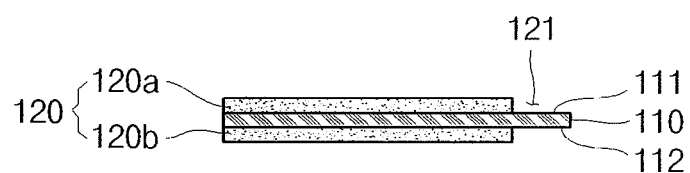

Referring to FIGS. 5B and 5C, an active material layer 120 is formed in operation S2. FIG. 5B is a plan view illustrating a first active material layer 120a and FIG. 5C is a sectional view taken along the line D-D' of FIG. 5B illustrating the active material layer 120 including the first active material layer 120a and a second active material layer 120b formed on respective sides of the current collector plate 110.

In operation S2, an active material is coated on at least one of the first face 111 and the second face 112 of the current collector plate 110 to form an active material layer 120. That is to say, the active material is coated on the entire area of the current collector plate 110 excluding an uncoated portion 121, that is, a portion to which the electrode tab 130 is adhered. Here, the first active material layer 120a is coated on the first face 111 of the current collector plate 110 at a substantially uniform thickness.

In addition, an active material is entirely coated beneath the second face 112 surface of the second face 112 of the current collector plate 110 to form a second active material layer 120b. When the current collector plate 110 is a current collector for a positive electrode plate, the active material may be a metal oxide, such as $LiCoO_2$, $LiNiO_2$, or $LiMn_2O_4$. When the current collector plate 110 is a current collector for a negative electrode plate, the active material may be graphite. However aspects of the present invention are not limited thereto.

Figure 5D:
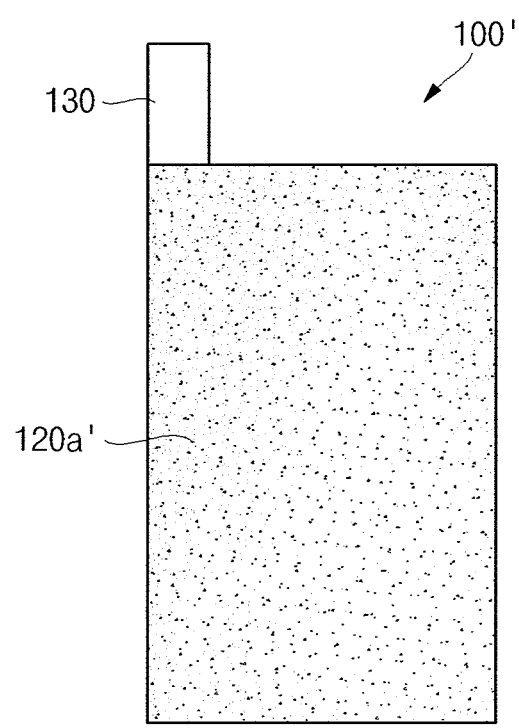

Referring to FIG. 5D, the electrode plate 100 is cut in operation S3. Operation S3 is an operation of cutting the electrode plate 100 in a direction of the line E-E' shown in FIG. 5B in order to form a plurality of electrode plate strips 100'. In operation S3, a typical cutting device is used in cutting the electrode plate 100. After the cutting of the electrode plate 100, the plurality of electrode plate strips 100' are formed.

Next, an electrode tab 130 is formed at an uncoated portion of each of the plurality of electrode plate strips 100'. The electrode tab 130 is directly adhered to at least one face of the current collector plate 110.

Figure 5E:
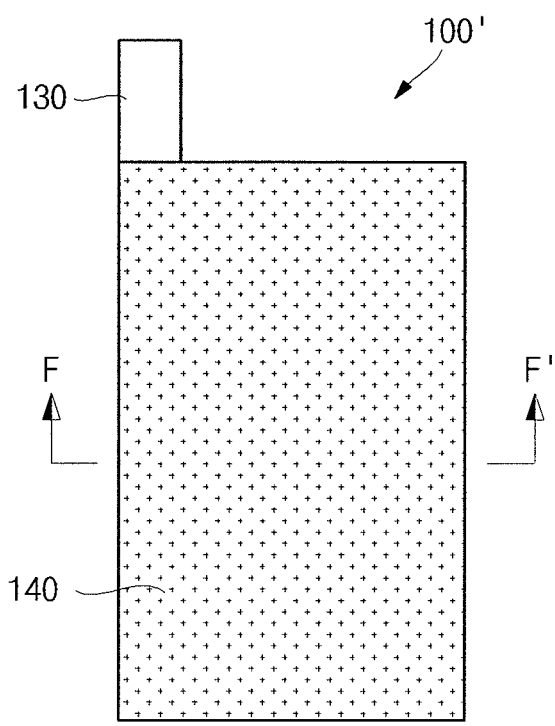
Figure 5F:
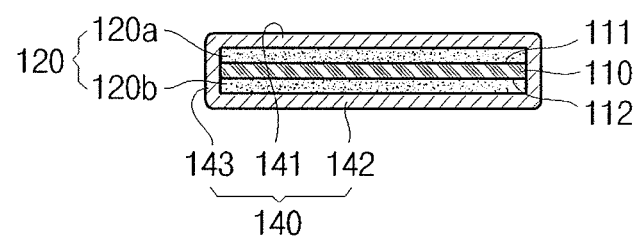

Referring to FIGS. 5E and 5F, coating is performed in operation S4. FIG. 5E is a plan view illustrating a coated one of the plurality of electrode plate strips 100' and FIG. 5F is a sectional view taken along the line F-F' of FIG. 5E.

In the coating operation S4, the current collector plate 110 and the active material layer 120 including a first active material layer 120a and a second active material layer 120b are coated with a ceramic material. That is to say, the ceramic layer 140 wraps surfaces of the current collector plate 110 and the active material layer 120 including the first active material layer 120a and the second active material layer 120b. In operation S4, the coating is performed as a dip coating or a spray coating operation. In the dip coating, one of the plurality of the electrode plate strips 100' is dipped in a solution containing a ceramic material. In the spray coating, a common spraying device is used with a common spray. Here, the coating is performed on the entire surface of the one of the plurality of the electrode plate strips 100', excluding the electrode tab 130. As described above, the coating of the ceramic layer is performed as a dip coating or a spray coating operation. Coating of even lateral surfaces of the one of the plurality of the electrode plate strips 100' is performed by using the dip coating or spray coating.

In operation S4, a first ceramic layer 141 is flatly coated on an outer surface of the first face 111 of the current collector plate 110 at a substantially uniform thickness and a second ceramic layer 142 is flatly coated on an outer surface of the second face 112. In operation S5, a third ceramic layer 143 connecting the first ceramic layer 141 to the second ceramic layer 142 is formed. In such a manner, the third ceramic layer 143 is coated on the current collector plate 110 and the active material layer 120. To improve the stability and reliability of the battery, the ceramic layer 140 is uniformly formed without defects.

As described above, the electrode plate is wrapped by a ceramic layer, so that it may not be exposed outside. Since the ceramic layer is formed to wrap the outer surfaces of the electrode plate, the electrode is not brought into contact with another electrode plate having an opposite polarity, thereby preventing an internal electrical short. In addition, the ceramic layer has surrounds the electrode plate in order to eliminate a necessity of a separator to be disposed between two opposite electrode plates, thereby increasing a volume capacity density of a battery in a unit volume.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly comprising:
   a first electrode plate and a second electrode plate, the first electrode plate comprising:
   a current collector plate having a first face and a second face facing away from the first face;
   an electrode tab fixed onto the first face of the current collector plate and elongated in a first direction extending in a first plane generally parallel to the first face of the current collector plate such that the electrode tab comprises a first portion overlapping with the current collector plate when viewed in a second direction perpendicular to the first plane and further that the electrode tab comprises a second portion that does not overlap with the current collector plate when viewed in the second direction;
   an active material layer formed on at least one of the first face and the second face of the current collector plate, wherein the current collector plate, the electrode tab and the active material layer form an integrated body, wherein the electrode tab extends in the first direction to partially cover the first face of the current collector plate and the active material layer covers a remaining portion of the first face of the current collector plate not covered by the electrode tab when viewed in a cross section taken in a second plane perpendicular to the first plane and parallel to the first direction; and
   a coating layer comprising a ceramic material coated over the integrated body such that the current collector plate is not exposed while the second portion of the electrode tab is exposed, wherein the second face of the current collector plate comprises a portion that overlaps the first portion of the electrode tab when viewed in the second direction, wherein the coating layer directly contacts the portion of the second face overlapping the first portion of the electrode tab.

2. The electrode assembly of claim 1, wherein the coating layer includes at least one material selected from the group consisting of silica ($SiO_2$), alumina ($Al_2O_3$), zirconium oxide ($ZrO_2$), and titanium oxide ($TiO_2$).

3. The electrode assembly of claim 1, wherein the coating layer includes at least one material selected from the group consisting of nitrides, hydroxides, alkoxides and ketone compounds of silicon (Si), aluminum (Al), zirconium (Zr), and titanium (Ti).

4. A manufacturing method of an electrode assembly, the method comprising:
providing a first electrode plate and a second electrode plate,
providing a first electrode plate comprising:
providing a current collector plate having a first face and a second face facing away from the first face;
fixing an electrode tab onto the first face of the current collector plate, the electrode tab elongated in a first direction extending in a first plane generally parallel to the first face of the current collector plate such that the electrode tab comprises a first portion overlapping with the current collector plate when viewed in a second direction perpendicular to the first plane and further that the electrode tab comprises a second portion that does not overlap with the current collector plate when viewed in the second direction;
forming an active material layer on at least one of a first face and a second face of a current collector plate, wherein the electrode tab extends in the first direction to partially cover the first face of the current collector plate and the active material layer covers a remaining portion of the first face of the current collector plate not covered by the electrode tab when viewed in a cross section taken in a second plane perpendicular to the first plane and parallel to the first direction, wherein the current collector plate, the electrode tab and the active material layer form an integrated body;
cutting the current collector plate;
coating a coating layer comprising a ceramic material over the integrated body such that the current collector plate is not exposed while the second portion of the electrode tab is exposed, wherein the second face of the current collector plate comprises a portion that overlaps the first portion of the electrode tab when viewed in the second direction, wherein the coating layer directly contacts the portion of the second face overlapping the first portion of the electrode tab; and
contacting a second electrode plate with the coating layer of the first electrode plate, thereby no separator is interposed between the first electrode plate and the second electrode plate.

5. The manufacturing method of claim 4, wherein the coating material is at least one material selected from the group consisting of silica ($SiO_2$), alumina ($Al_2O_3$), zirconium oxide ($ZrO_2$), and titanium oxide ($TiO_2$).

6. The manufacturing method of claim 4, wherein the coating of the coating layer is performed using at least one material selected from the group consisting of nitrides, hydroxides, alkoxides and ketone compounds of silicon (Si), aluminum (Al), zirconium (Zr), and titanium (Ti).

7. The manufacturing method of claim 4, wherein the coating of the coating layer is performed by dip coating or spray coating.

8. The electrode assembly of claim 1, wherein the second electrode plate is folded multiple times in a zigzag configuration to provide multiple panels in the second electrode plate, wherein the multiple panels comprise a first panel and a second panel, which are consecutively positioned in the zigzag configuration of the second electrode plate and oppose each other, wherein the first electrode plate is placed between the first and second panels of the second electrode plate and contacts the first and second panels without a separator between the first panel and the first electrode plate and further without a separator between the second panel and the first electrode plate.

9. The electrode assembly of claim 1,
wherein the coating layer comprises a first coating layer coated on an outer surface of the first face of the current collector plate at a substantially uniform thickness,
wherein the coating layer further comprises a second coating layer coated on an outer surface of the second face, and
wherein the coating layer further comprises a third coating layer coated on
lateral surfaces of the current collector plate.

10. The electrode assembly of claim 9, wherein the third coating layer is formed on the lateral surfaces of the current collector plate and the active material layer.

11. The manufacturing method of 4, wherein the second electrode plate is folded multiple times in a zigzag configuration to provide multiple panels in the second electrode plate, wherein the multiple panels comprise a first panel and a second panel, which are consecutively positioned in the zigzag configuration of the second electrode plate and oppose each other, wherein the first electrode plate is placed between the first and second panels of the second electrode plate and contacts the first and second panels without a separator between the first panel and the first electrode plate and further without a separator between the second panel and the first electrode plate.

12. The manufacturing method of claim 4,
wherein the coating layer comprises a first coating layer coated on an outer surface of the first face of the current collector plate at a substantially uniform thickness,
wherein the coating layer further comprises a second coating layer coated on an outer surface of the second face, and
wherein the coating layer further comprises a third coating layer coated on lateral surfaces of the current collector plate.

13. The manufacturing method of claim 12, wherein coating the third coating layer includes allowing the third coating layer to contact the lateral surfaces of the current collector plate and the active material layer.

* * * * *

UNITED STATES PATENT AND TRADEMARK OFFICE
CERTIFICATE OF CORRECTION

PATENT NO. : 9,065,153 B2
APPLICATION NO. : 12/861684
DATED : June 23, 2015
INVENTOR(S) : Youngbae Sohn It is certified that error appears in the above-identified patent and that said Letters Patent is hereby corrected as shown below:

In the Claims

In Claim 11 (column 10, line 33), change "of 4," to --of claim 4,--.

Signed and Sealed this
Twelfth Day of April, 2016

Michelle K. Lee
*Director of the United States Patent and Trademark Office*